(12) United States Patent
Bharadwaj et al.

(10) Patent No.: US 12,355,563 B2
(45) Date of Patent: Jul. 8, 2025

(54) CORRELATING TRANSCEIVER PARAMETERS FOR INSIGHT INTO TRANSCEIVER HEALTH

(71) Applicant: Cisco Technology, Inc., San Jose, CA (US)

(72) Inventors: Harsha Bharadwaj, Bangalore (IN); Paresh Gupta, La Crescenta, CA (US); Sunil John Varghese, Bangalore (IN); Joy Chatterjee, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 546 days.

(21) Appl. No.: 17/582,838

(22) Filed: Jan. 24, 2022

(65) Prior Publication Data

US 2023/0239073 A1 Jul. 27, 2023

(51) Int. Cl.
*H04L 1/00* (2006.01)
*H04B 17/345* (2015.01)
(Continued)

(52) U.S. Cl.
CPC ........... *H04L 1/004* (2013.01); *H04B 17/345* (2015.01); *H04B 17/354* (2015.01); *H04W 24/08* (2013.01)

(58) Field of Classification Search
CPC ..... H04L 1/004; H04B 17/345; H04B 17/354; H04W 24/08
See application file for complete search history.

(56) References Cited

U.S. PATENT DOCUMENTS

| 6,215,565 B1 * | 4/2001 | Davis ............... H04B 10/07953 398/9 |
| 6,526,261 B1 * | 2/2003 | Takeuchi ............. H04W 52/20 455/67.11 |

(Continued)

FOREIGN PATENT DOCUMENTS

| CN | 101046501 A | 10/2007 |
| CN | 101344439 A | 1/2009 |

(Continued)

OTHER PUBLICATIONS

Abhijit Chakravarty, et al., "Characterizing Large-Scale Production Reliability for 100G Optical Interconnect in Facebook Data Center," Facebook, 2017, 1 page.

(Continued)

*Primary Examiner* — Jinsong Hu
*Assistant Examiner* — Rui M Hu
(74) *Attorney, Agent, or Firm* — Edell, Shapiro & Finnan, LLC

(57) ABSTRACT

A method comprises: at a management entity configured to monitor a transceiver system having a transceiver to receive a signal that conveys data frames transmitted by a peer transceiver over a connection: collecting time series values for operating parameters of the transceiver associated with received data frames, including (i) a receive power, and (ii) counts of different media access control (MAC) layer frame errors that respectively indicate degradation levels for system performance ranked from highest to lowest; using the time series values, performing correlations of the receive power against the counts of the different MAC layer frame errors according to a correlation hierarchy that indicates which of the correlations correspond to which of the degradation levels, to produce correlation results; and respon- (Continued)

sive to the correlation results, determining a degraded component of the transceiver system.

20 Claims, 9 Drawing Sheets

(51) Int. Cl.
*H04B 17/354* (2015.01)
*H04W 24/08* (2009.01)

(56) References Cited

U.S. PATENT DOCUMENTS

| | | | |
|---|---|---|---|
| 6,574,226 B1 | 6/2003 | Nakano et al. | |
| 6,665,497 B1* | 12/2003 | Hamilton-Gahart | H04B 10/2513 398/139 |
| 6,765,659 B1 | 7/2004 | Bhatnagar et al. | |
| 6,950,865 B1 | 9/2005 | Depaolantonio | |
| 7,035,262 B1 | 4/2006 | Joshi | |
| 7,043,541 B1 | 5/2006 | Bechtolsheim et al. | |
| 7,103,149 B1 | 9/2006 | Depaolantonio | |
| 7,142,504 B1 | 11/2006 | Uzun | |
| 7,181,137 B1 | 2/2007 | Tamburello et al. | |
| 7,190,896 B1 | 3/2007 | Wang et al. | |
| 7,224,898 B1 | 5/2007 | Depaolantonio | |
| 7,228,447 B1 | 6/2007 | Day | |
| 7,457,725 B1 | 11/2008 | Civilini | |
| 7,774,444 B1* | 8/2010 | George | H04L 41/145 709/224 |
| 7,886,031 B1* | 2/2011 | Taylor | H04L 41/0873 709/224 |
| 8,995,829 B2 | 3/2015 | Barbieri et al. | |
| 9,112,645 B2* | 8/2015 | Hassan | H04L 1/203 |
| 9,425,893 B1* | 8/2016 | Srinivasan | H04L 1/00 |
| 9,585,175 B2* | 2/2017 | Sung | H04L 12/4633 |
| 9,780,878 B2* | 10/2017 | Sackman | H04B 10/118 |
| 9,838,317 B1 | 12/2017 | Yadav | |
| 10,346,239 B1 | 7/2019 | Ortega Gutierrez et al. | |
| 10,396,897 B1 | 8/2019 | Malave et al. | |
| 10,686,695 B1 | 6/2020 | Nainar et al. | |
| 10,924,944 B2* | 2/2021 | Seol | H04W 24/04 |
| 11,128,541 B2 | 9/2021 | Sattiraju et al. | |
| 11,778,354 B2* | 10/2023 | Chaouch | H04Q 11/0005 398/2 |
| 2002/0030867 A1 | 3/2002 | Iannone et al. | |
| 2002/0039217 A1* | 4/2002 | Saunders | H04B 10/25137 398/147 |
| 2002/0047862 A1* | 4/2002 | Aoki | H04L 12/6418 709/224 |
| 2002/0097463 A1 | 7/2002 | Saunders et al. | |
| 2003/0151801 A1* | 8/2003 | Jayaram | H04J 14/025 359/341.1 |
| 2003/0169998 A1* | 9/2003 | Premaratne | H04B 10/27 385/147 |
| 2003/0179701 A1 | 9/2003 | Salch et al. | |
| 2003/0179742 A1 | 9/2003 | Ogier et al. | |
| 2004/0218919 A1* | 11/2004 | Hunsche | H04B 10/07953 398/33 |
| 2005/0010681 A1 | 1/2005 | Katukam et al. | |
| 2005/0010849 A1 | 1/2005 | Ryla et al. | |
| 2005/0090911 A1 | 4/2005 | Ingargiola et al. | |
| 2005/0111843 A1 | 5/2005 | Takeuchi et al. | |
| 2005/0209806 A1 | 9/2005 | Yoneyama | |
| 2005/0216783 A1 | 9/2005 | Sundaram et al. | |
| 2006/0002709 A1* | 1/2006 | Dybsetter | G01K 11/32 374/E11.015 |
| 2006/0044725 A1 | 3/2006 | Robinson et al. | |
| 2006/0104641 A1 | 5/2006 | Casanova et al. | |
| 2007/0118546 A1 | 5/2007 | Acharya | |
| 2007/0124625 A1* | 5/2007 | Hassan | H04L 43/50 714/704 |
| 2007/0217794 A1 | 9/2007 | Sakamoto et al. | |
| 2007/0280684 A1* | 12/2007 | Onoda | H04B 10/07955 398/38 |
| 2008/0010661 A1* | 1/2008 | Kappler | H04L 65/80 725/120 |
| 2008/0040302 A1 | 2/2008 | Perrizo | |
| 2008/0205900 A1* | 8/2008 | Cole | H04J 14/0289 398/153 |
| 2008/0279092 A1* | 11/2008 | Hassan | H04L 1/002 370/216 |
| 2008/0279093 A1* | 11/2008 | Hassan | H04L 1/0002 370/242 |
| 2010/0014855 A1 | 1/2010 | Arnone et al. | |
| 2010/0080562 A1* | 4/2010 | Perkins | H04J 14/0246 398/98 |
| 2010/0157824 A1* | 6/2010 | Thompson | H04L 43/0829 370/252 |
| 2012/0195195 A1 | 8/2012 | Rai et al. | |
| 2012/0275510 A1* | 11/2012 | Jakubczak | H04N 19/62 375/240 |
| 2012/0300801 A1* | 11/2012 | McLeod | H04B 10/07955 372/29.02 |
| 2013/0028597 A1* | 1/2013 | Ye | H04B 10/07953 398/26 |
| 2013/0286846 A1 | 10/2013 | Atlas et al. | |
| 2015/0256825 A1* | 9/2015 | Priest | H04N 17/04 348/181 |
| 2016/0112155 A1* | 4/2016 | Koga | H04B 10/613 714/776 |
| 2016/0378150 A1 | 12/2016 | Sega et al. | |
| 2017/0093907 A1 | 3/2017 | Srivastava | |
| 2017/0279666 A1 | 9/2017 | Alshinnawi et al. | |
| 2017/0289912 A1* | 10/2017 | Ishii | H04L 1/22 |
| 2018/0060752 A1 | 3/2018 | Gross et al. | |
| 2018/0324198 A1 | 11/2018 | Borthakur et al. | |
| 2019/0158175 A1 | 5/2019 | Shrikhande et al. | |
| 2019/0182120 A1 | 6/2019 | Coccia et al. | |
| 2019/0188070 A1* | 6/2019 | Das | G06F 11/0706 |
| 2019/0238400 A1 | 8/2019 | Yang et al. | |
| 2019/0303726 A1 | 10/2019 | Cote et al. | |
| 2020/0021358 A1* | 1/2020 | MacCaglia | H04J 14/0271 |
| 2020/0350990 A1* | 11/2020 | Beattie, Jr. | H04J 14/0227 |
| 2021/0028994 A1 | 1/2021 | Sattiraju et al. | |
| 2021/0143909 A1* | 5/2021 | Beattie, Jr. | H04B 10/2513 |
| 2021/0367397 A1* | 11/2021 | Shirai | H04B 10/40 |
| 2022/0021449 A1* | 1/2022 | Kawahara | H04B 10/0793 |
| 2022/0075683 A1* | 3/2022 | Ghatak | G06F 11/0709 |
| 2022/0100939 A1* | 3/2022 | Mishra | G06F 30/398 |
| 2022/0131627 A1* | 4/2022 | Beacall | H04B 17/3913 |
| 2022/0295316 A1* | 9/2022 | Vos | H04W 72/23 |
| 2023/0010692 A1* | 1/2023 | Sjödin | H04W 24/02 |

FOREIGN PATENT DOCUMENTS

| | | |
|---|---|---|
| CN | 103886374 A | 6/2014 |
| WO | 2007051843 A1 | 5/2007 |
| WO | 2008150754 A1 | 12/2008 |

OTHER PUBLICATIONS

"Simplify HBA Management and Remediate Network Performance Problems," Broadcom, Emulex SAN Manager, Feb. 26, 2021, 6 pages.

"Pearson correlation coefficient," Wikipedia, Last edited Jan. 18, 2022, 18 pages.

SFF Committee, "Diagnostic Monitoring Interface for Optical Transceivers," SFF-8472, Rev 10.01, Mar. 1, 2017, 2 pages.

"k-nearest neighbors algorithm," Wikipedia, https://en.wikipedia.org/wiki/K-nearest_neighbors_algorithm, Oct. 8, 2019., 11 pages.

"Statistical population," Wikipedia, https://en.wikipedia.org/wiki/Statistical_population, Sep. 25, 2019, 3 pages.

"Covariance," Wikipedia, https://en.wikipedia.org/wiki/Covariance, https://en.wikipedia.org/wiki/Covariance, Oct. 31. 2019, 6 pages.

"Standard deviation," Wikipedia, https://en.wikipedia.org/wiki/Standard_deviation, Nov. 13, 2019, 23 pages.

(56) References Cited

OTHER PUBLICATIONS

"knn.predict: KNN Prediction Routine using Pre-Calculated Distances," RDocumentation, Kodama, Version 0.0.1, https://www.rdocumentation.org/packages/KODAMA/versions/0.0.1/topics/knn.predict, downloaded Jan. 24, 2022, 3 pages.

* cited by examiner

CORRELATING TRANSCEIVER PARAMETERS FOR INSIGHT INTO TRANSCEIVER HEALTH

TECHNICAL FIELD

The present disclosure relates to identifying degrading components in a transceiver system.

BACKGROUND

A communication component that includes a transmitter and a receiver is referred to as a transceiver. A transceiver is often considered a weakest link in a network data switch because the transceiver is highly failure prone. A vendor specified safe operating range for a transceiver in terms of temperature, supply voltage, transmit bias current, transmit and receive power (i.e., light levels for optical transceivers) may be programmed into the transceiver. The transceiver typically supports diagnostics that measure various operating parameters using internal sensors, and makes values of such measurements externally accessible through an interface. The operating parameters can be influenced by high ambient temperature, receive power drop due to low transmit power from a peer transceiver, and degradation of transceiver hardware due to electrical interference, abnormal power/voltage, or otherwise. A transceiver that operates outside of the vendor specified safe operating range may eventually malfunction and cause frame errors when decoding received data frames. On the other hand, the mere presence of the frame errors does not mean that the transceiver is faulty, because the frame errors may not be caused by the transceiver.

Currently, there is a lack of early trend identification of transceiver degradation and a lack of triaging to identify a root cause of such degradation, especially at the physical layer and at the photonics level (Level 0 (L-0)) in an optical communication system, which includes optical transceivers, optical cables, and optical connectors. Which of these components should be replaced is not made known to an administrator today. Therefore, customers are compelled to change transceivers and related components periodically, and often unnecessarily, as part of a monthly or quarterly health audit.

DESCRIPTION OF EXAMPLE EMBODIMENTS

Overview

A method comprises: at a management entity configured to monitor a transceiver system having a transceiver to receive a signal that conveys data frames transmitted by a peer transceiver over a connection: collecting time series values for operating parameters of the transceiver associated with received data frames, including (i) a receive power, and (ii) counts of different media access control (MAC) layer frame errors that respectively indicate degradation levels for system performance ranked from highest to lowest; using the time series values, performing correlations of the receive power against the counts of the different MAC layer frame errors according to a correlation hierarchy that indicates which of the correlations correspond to which of the degradation levels, to produce correlation results; and responsive to the correlation results, determining a degraded component of the transceiver system.

Example Embodiments

Figure 1:
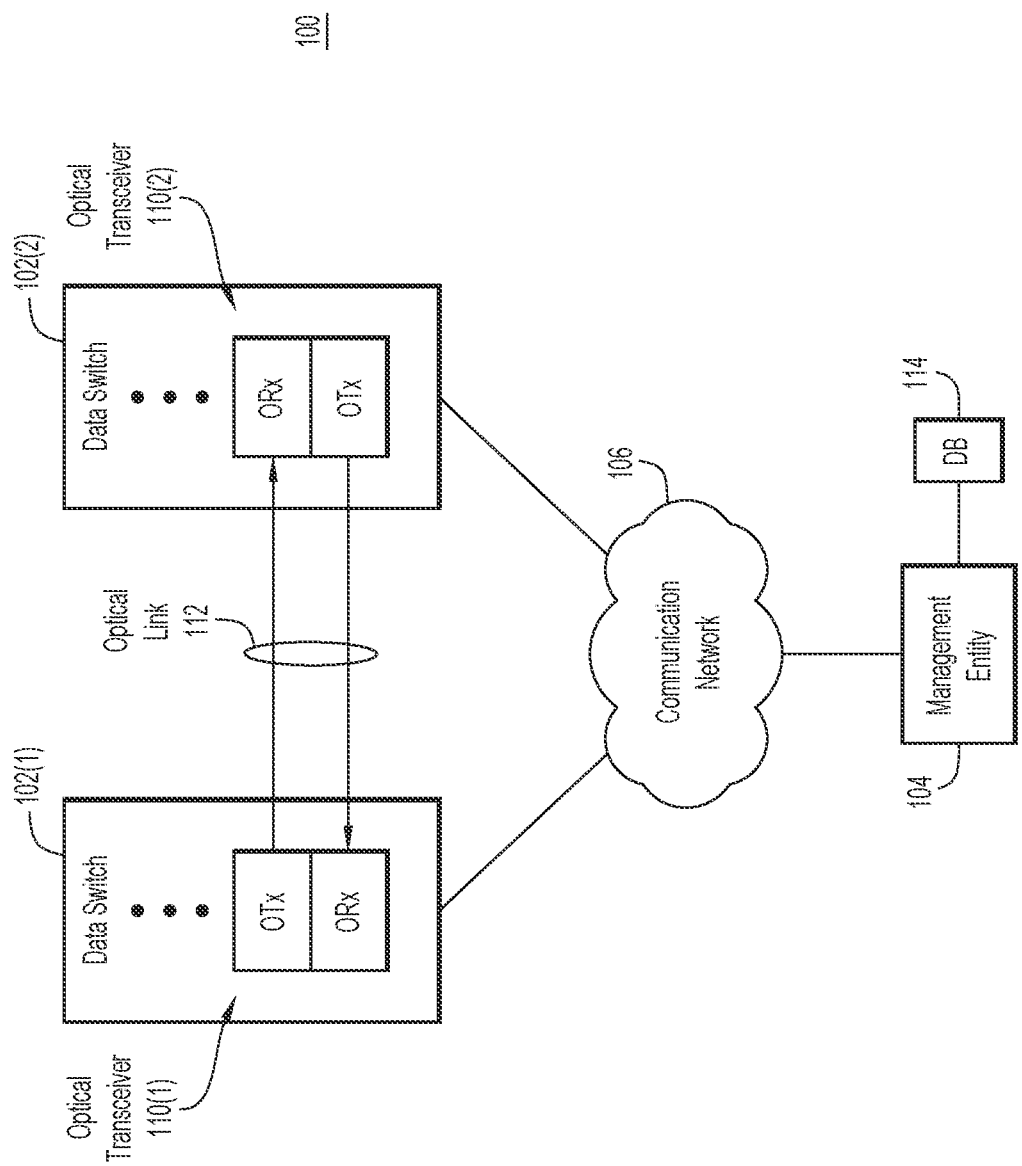
FIG. 1 is a block diagram of a data switch system in which embodiments directed to early identification of malfunctioning or degrading optical transceivers may be implemented, accordance to an example embodiment.

With reference to FIG. 1, there is a block diagram of an example data switch system 100 in which embodiments directed to early identification of malfunctioning or degrading optical transceivers may be implemented. By way of example, the embodiments presented herein are described in the context of an optical system including optical transceivers; however, it is understood that the embodiments apply equally to a system having transceivers that are not optical transceivers. Data switch system 100 includes data switches 102(1) and 102(2) (collectively referred to as "data switches 102") and a management entity 104 connected to and configured to communicate with each other over a communication network 106. Communication network 106 may include one or more wide area networks (WANs), such as the Internet, and one or more local area networks (LANs). Data switches 102 may be located in different data centers or a common data center, for example. In an example, data switches 102 may be deployed in a switch fabric of a Fibre Channel (FC) storage area network (SAN) (FC SAN) in which the data switches exchange FC frames in accordance with an FC protocol. Other data switch examples are possible.

Data switches 102 may include multiple line cards having data switch interfaces (also referred to simply as "ports" or "interfaces") that employ optical transceivers to communicate with each other over optical links. In an embodiment, the optical transceivers may be configured as small form-factor pluggable (SFP) optical transceivers. As shown, data switches 102(1) and 102(2) respectively include "peer" optical transceivers 110(1) and 110(2) (collectively referred to as "optical transceivers 110") that exchange bidirectional optical signals, modulated to convey information, such as data packets or frames, over an optical link 112 connected between the peer optical transceivers. Optical link 112 may include one or more optical fibers, may traverse one or more networks, or may be a direct optical connection that does not span any networks, for example.

Each optical transceiver 110(i) respectively includes an optical transmitter OTx and an optical receiver ORx connected to optical link 112 through optical connectors (not specifically shown) of the optical transceiver. Optical link 112 and the optical connectors form an "optical connection" between peer optical transceivers. As used herein, the term "optical transceiver system" refers to the peer optical transceivers and the optical connection between them. While only one optical transceiver system is shown in FIG. 1, in practice there are a large number of such optical transceiver systems. In the example of FIG. 1, optical transmitter OTx of optical transceiver 110(1) transmits an optical signal to optical receiver ORx of optical transceiver 110(2) (the peer of optical transceiver 110(1)) over optical link 112, while optical transmitter OTx of optical transceiver 110(2) transmits an optical signal to optical receiver ORx of optical transceiver 110(1) over the optical link.

In the example of FIG. 1, management entity 104 communicates with optical transceivers 110(1) and 110(2) through data switches 102(1) and 102(2) and communication network 106. In another arrangement in which management entity 104 is integrated with data switches 102(1) and 102(2), the management entity may communicate with optical transceivers 110(1) and 110(2), directly. Management entity 104 has access to a database (DB) 114 configured to store network topology information that specifically identifies each of data switches 102(1) and 102(2) and their respective optical transceivers 110(1) and 110(2), and identifies which pairs of the optical transceivers are peers. In addition, database 114 stores values of various operating parameters for the interfaces of data switches of 102(1) and 102(2), including operating parameters for optical transceivers 110(1) and 110(2), as will be described below.

Figure 2:
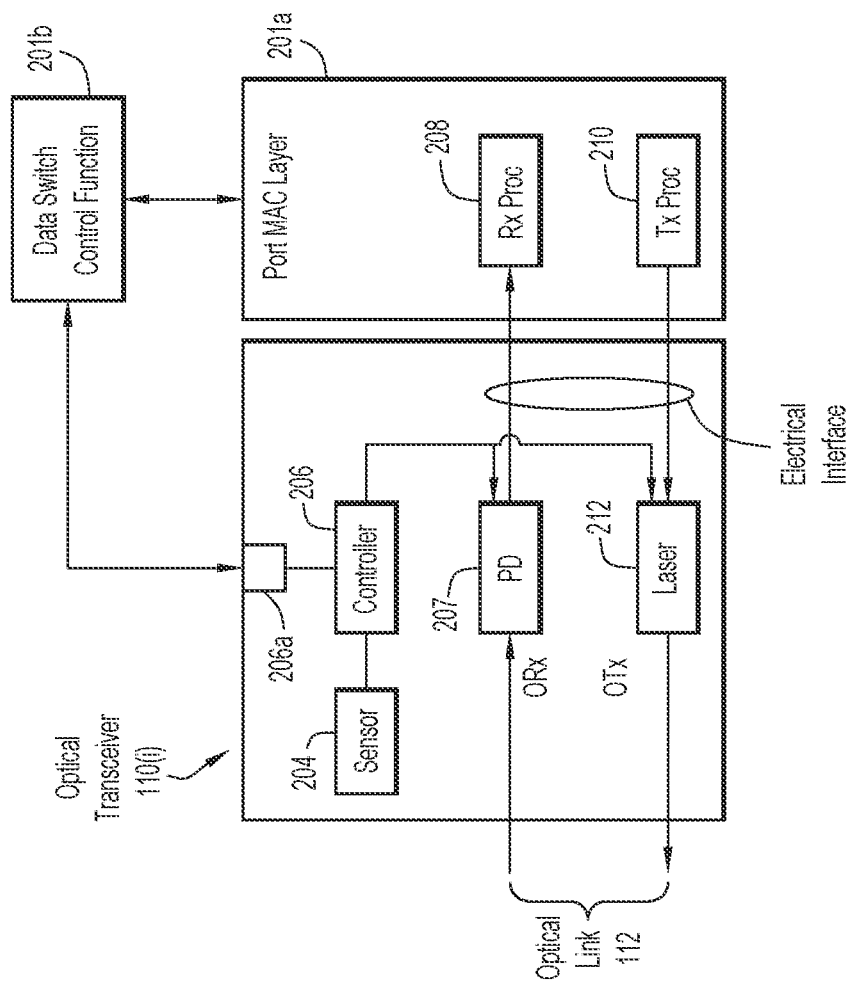
FIG. 2 is a high-level block diagram of an optical transceiver used in the data switch system, according to an example embodiment.

With reference to FIG. 2, there is a block diagram of optical transceiver 110(i) (e.g., optical transceiver 110(1) or 110(2)) incorporated into a data switch port of a data switch and configured to communicate with a port media access control (MAC) layer 201a and a control function 201b of the data switch into which the aforementioned components are integrated. Optical transceiver 110(i) includes optical receiver ORx and optical transmitter OTx to receive and transmit respective optical signals modulated to convey data frames, respectively, environmental sensors 204 (e.g., a temperature sensor that measures a temperature of the optical transceiver), a (local) controller 206 to control the optical transceiver, and an interface 206a through which the local controller communicates with control function 201b. Optical receiver ORx includes a photodiode (PD) 207 to convert an optical signal modulated to convey data frames received over optical link 112 (i.e., a received optical signal) to electrical data, and to provide the electrical data to a receive (Rx) processor 208 of port MAC layer 201a to recover the data frames from the electrical data. Rx processor 208 performs data frame processing/decoding, including data frame detection, forward error correction (FEC), CRC processing, and so on. Optical transmitter OTx receives electrical data that conveys data frames from a transmit (Tx) processor 210 of port MAC layer 201a. Optical transmitter OTx includes a modulated laser 212 to convert the electrical data from Tx processor 210 to an optical signal, and transmit the optical signal over optical link 112.

Together, port MAC layer 201a and controller 206 monitor, compute, and record, in real-time, instantaneous values of various operating parameters (also referred to as "SFP parameters") of optical transceiver 110(i) while the optical transceiver and the port MAC layer cooperate to transmit, receive, and process optical signals modulated to convey data frames or data packets. The operating parameters may include temperature, optical Tx power, and optical Rx power. More specifically, operating parameters tracked by port MAC layer 201a include numbers or counts of different types of (receive) MAC layer frame bit errors (referred to simply as MAC layer "frame errors") generated while processing/decoding data frames (referred to simply as "frames") from a received optical signal. The different types of MAC layer frame errors (referred to as "different MAC layer frame errors") may include correctable FEC errors, uncorrectable FEC errors, invalid transmission word (ITW) errors or "ITWs," CRC errors, and link resets (e.g., FC link resets), for example. Port MAC layer 201a and controller 206 report their collected operating parameter values to control function 201b, which may then report the values to management entity 104, as described below.

In the ensuing description, the term "optical" may be omitted when referring to an optical transceiver, an optical transmitter, or an optical receiver, which may then be referred to simply as a transceiver, a transmitter, or a receiver.

In accordance with embodiments presented herein, management entity 104 collects from each of the transceivers of data switches 102 time series values (also referred to as data points) for various operating parameters of the transceivers, and stores the information in database 114. Management entity 104 analyzes the time series values using, e.g., trend analysis and correlations of time series values for different operating parameters against each other, to perform automated early identification of malfunctioning or degrading components among the transceivers and/or connections to the transceivers, such as cables and connectors connecting the transceivers. Based on results of the analysis, management entity 104 provides or reports, to an administrative portal associated with the management entity and/or customer entities, recommended actions for remediation of identified problems or potential problems. The embodiments enable an administrator to quickly triage whether, and which ones of, the transceivers are degrading and what remedial action should be taken, and the urgency of such remedial action. The administrator uses the provided information to implement a proactive replacement strategy to replace degrading components before they fail completely, which saves cost and time.

As mentioned above, management entity 104 first obtains or collects time series values for the various operating parameters of the transceivers via data switches 102. In one example, management entity 104 periodically polls or queries data switches 102 for the values, and the data switches respond to the polls with the values. In another example, management entity 104 configures data switches 102 to stream the values to the management entity via telemetry streams. Either way, management entity 104 obtains (i.e., receives) time series values for each of the following operating parameters:

a. Temperature, voltage, current, optical Tx power (i.e., "Tx power"), and optical Rx power (i.e., "Rx power").
   In the FC SAN example, for edge ports (e.g., F-ports), the operating parameters further include values of an attached host bus adapter (HBA) (e.g., N-port) transceiver, which may include an "SFP diagnostic parameters descriptor" defined by a read diagnostic parameter (RDP) protocol.

b. Numbers or counts of different (types of) MAC layer frame errors, including numbers of link resets, CRC errors, FEC uncorrectable errors and ITWs, and FEC correctable errors.

A "time series" for a given operating parameter is a time-ordered series or sequence of values of the given operating parameter. In an example, management entity 104 may collect the time series values of the operating parameters of (a) and (b) listed above with a same cadence or periodicity over multiple days. Management entity 104 stores the time series values for each operating parameter for each optical transceiver in database 114 (also referred to as the "time series" database) and associates the time series values with the corresponding transceiver.

Next, management entity 104 performs an individual trend analysis on each set of time series values for each transceiver to derive an individual trend line for each of the sets of time series values for the transceiver. Management entity 104 stores all of the trend lines in database 114 in association with the time series values from which the trend lines are derived, and in association with the transceiver to which the trend lines pertain. For example, management entity 104 performs an individual trend analysis on the respective time series values for each of temperature, Tx power, Rx power, and each of the different MAC layer frame errors, to produce respective trend lines for temperature, Tx power, Rx power, and each of the different MAC layer frame errors. A given trend line may show an increasing, decreasing, or relatively constant trend over time for the time series values used to generate the trend line. In an example, the trend analysis applies a single order polynomial regression fit on the time series values to derive the corresponding trend line, although other known or hereafter developed trend analysis techniques may be used.

Figure 3:
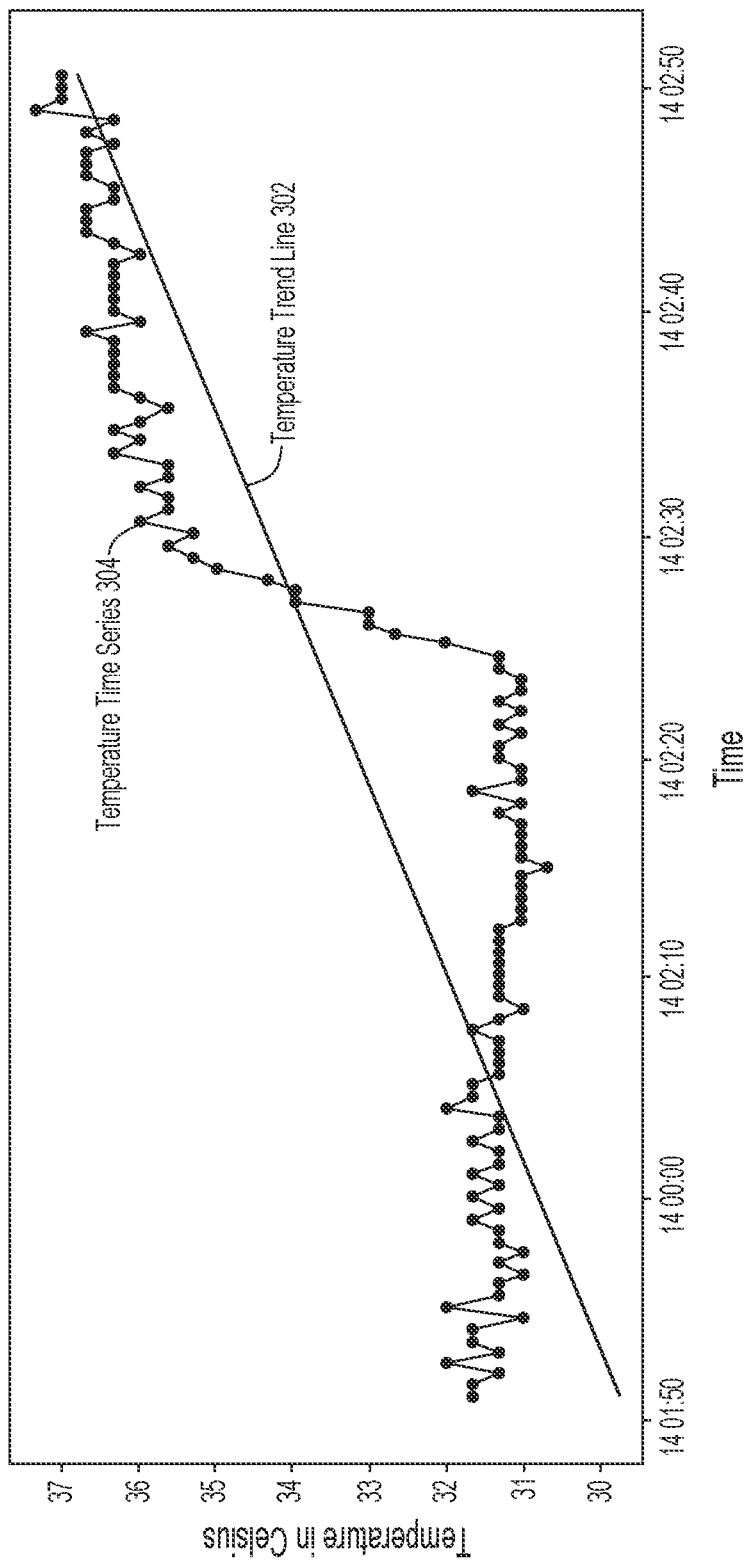
FIG. 3 is an illustration of a temperature trend line for an optical transceiver, according to an example embodiment.

With reference to FIG. 3, there is an illustration of an example temperature trend line 302 for a transceiver. Temperature trend line 302 was generated using a polynomial-fit to 30 seconds of temperature time series values 304 collected from the transceiver over a one-hour period. Temperature trend line 302 shows an increasing trend over time for the temperature. A trend slope=0.058 of temperature trend line 302 represents a quantitative measure of the increasing trend over time.

According to the embodiments presented herein, management entity 104 derives and analyzes trend lines of various operating parameters for peer transceivers in a transceiver system that share a connection. As will be described, when management entity 104 determines that a trend line for one of the operating parameters of one of the transceivers has an increasing/decreasing trend that exceeds or equals a threshold (e.g., of >=10%) based on the slope of the trend line fit, or that a trend line for an operating parameter was derived from time series values of the operating parameter that exceed a threshold, the management entity performs subsequent analysis, using correlations of the time series values for the operating parameter against time series values of other operating parameters for the transceiver and its peer transceiver. The correlations identify which of one of the transceiver, the peer transceiver, and the connection between the two may be degrading, i.e., experiencing or causing degraded performance. Different types of analysis for identifying possibly degrading components in a transceiver system are described below.

Transceiver-Pair Tx/Rx Power Analysis

Management entity 104 may perform a transceiver-pair Tx/Rx power analysis on peer transceivers. As described above, the peer transceivers include a transmitter of a transmit-side transceiver that transmits an optical signal to a receiver of a receive-side transceiver over a connection between the two. The transmitter transmits the optical signal with a Tx power (measured at the transmit-side transceiver) and the receiver receives the optical signal with an Rx power (measured at the receive-side transceiver). Normally, the Tx power is expected to be positively correlated to the Rx power. That is, the time series values of the Rx power captured over a time window should increase, decrease, or remain constant with the time series values of the Tx power captured over the time window. Normally, the Rx power should be less than the Tx power by a constant loss due to transmission of the optical signal through the connection between the transmitter and the peer receiver. On the other hand, a varying loss indicates that one of the transmitter/transmit-side transceiver, the receiver/receive-side transceiver, or the connection between them may be degrading.

A correlation between the time series values of the Rx power (also referred to as "Rx power time series values") and the time series values of the Tx power (also referred to as the "Tx power time series values") of the peer transceiver provides a useful quantitative measure of how the Rx power and the Tx power vary with respect to each other. To this end, management entity 104 performs a Pearson correlation of the Tx power time series values of the peer transceiver against the Rx power time series values, to produce a Pearson coefficient (i.e., a correlation result) that measures how strongly the two sets of time series values are positively correlated (i.e., both sets of time series values are increasing together or decreasing together) or negatively correlated (i.e., one set of time series values is increasing while the other set of time series values is decreasing), or whether the sets of time series values are relatively uncorrelated. More specifically, the Pearson coefficient provides a sliding-scale correlation measure that ranges from −1 (most negatively correlated) to +1 (most positively correlated). In another example, the −1 to +1 range may be normalized from 0 to +1.

When management entity 104 correlates the Tx power time series values against the Rx power time series values line using the Pearson correlation, the value of the Pearson coefficient that results may indicate the following different relationships associated with the Pearson coefficient:

a. When the Pearson coefficient indicates a lack of a strong correlation, there may be a problem in the connection between the peer transceivers. For example, when the Tx power is not trending down, but the Rx power is trending down, there may be a degrading connection or a degrading receive-side transceiver. In that case, a trouble-shooting sequence should first check and/or replace the connection (e.g., optical cable and/or connectors), and then check and/or replace the receive-side transceiver.

b. When the Pearson coefficient indicates a positive correlation, because the Tx power time series values and the Rx Power time series of values are both trending down, then the transmit-side transceiver may be degrading and thus the transmit-side transceiver should be replaced.

Figure 4:
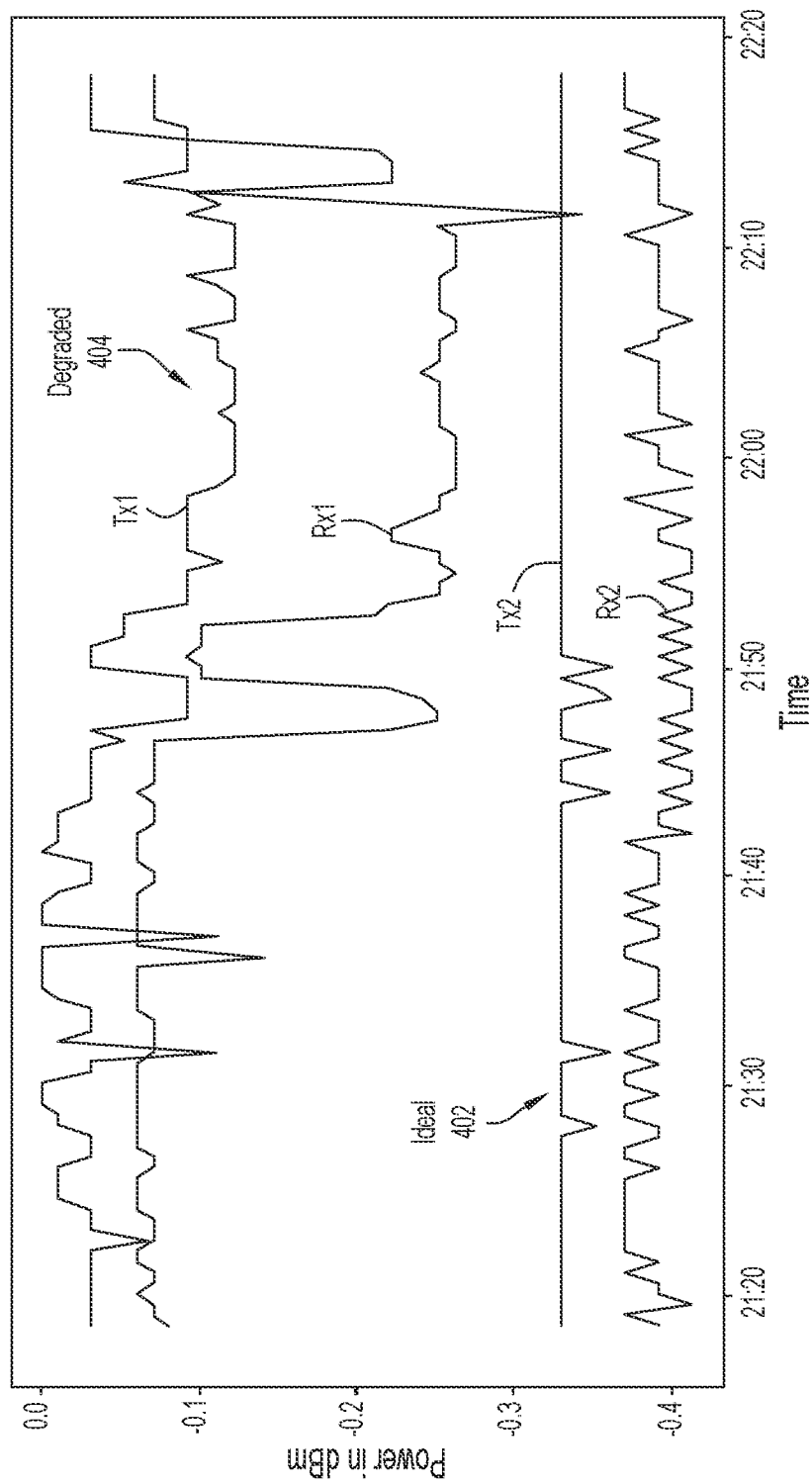
FIG. 4 shows comparison plots for optical transmit power and optical receive power for peer optical transceivers operating in an ideal scenario and a degraded scenario, according to an example embodiment.

With reference to FIG. 4, there is an illustration of Tx power of an optical signal transmitted by an optical transceiver (over an optical link) and Rx power of the optical signal as received by a peer optical transceiver from the optical link for two different scenarios, including an ideal (i.e., non-degraded) scenario 402 and a degraded scenario 404. In degraded scenario 404, during a time period from 21:50 to 22:10, Rx power Rx1 dips compared to Tx power Tx1, which indicates a more than expected optical power loss during the time period compared to ideal scenario 402. In ideal scenario 402, Rx power Rx2 closely follows Tx power Tx2, with a fairly constant channel loss over the optical connection between the peer optical transceivers.

Tx Power and Temperature Analysis

Management entity 104 may perform a Tx power time series values vs. temperature time series values correlation to produce a correlation result to identify possibly degraded components of a transceiver. The Tx power can be influenced by the temperature of the transmitter. Normally, when this occurs, the Tx power is inversely correlated to the temperature, i.e., an increase in the temperature causes a decrease in the Tx power, which means that the Tx power and the temperature are negatively correlated. When management entity 104 detects this correlation result, arising from an increase in temperature, the management entity may notify an administrator portal that the Tx power loss is likely due to the increase in temperature. An action to decrease the ambient temperature may then be taken.

Figure 5A:
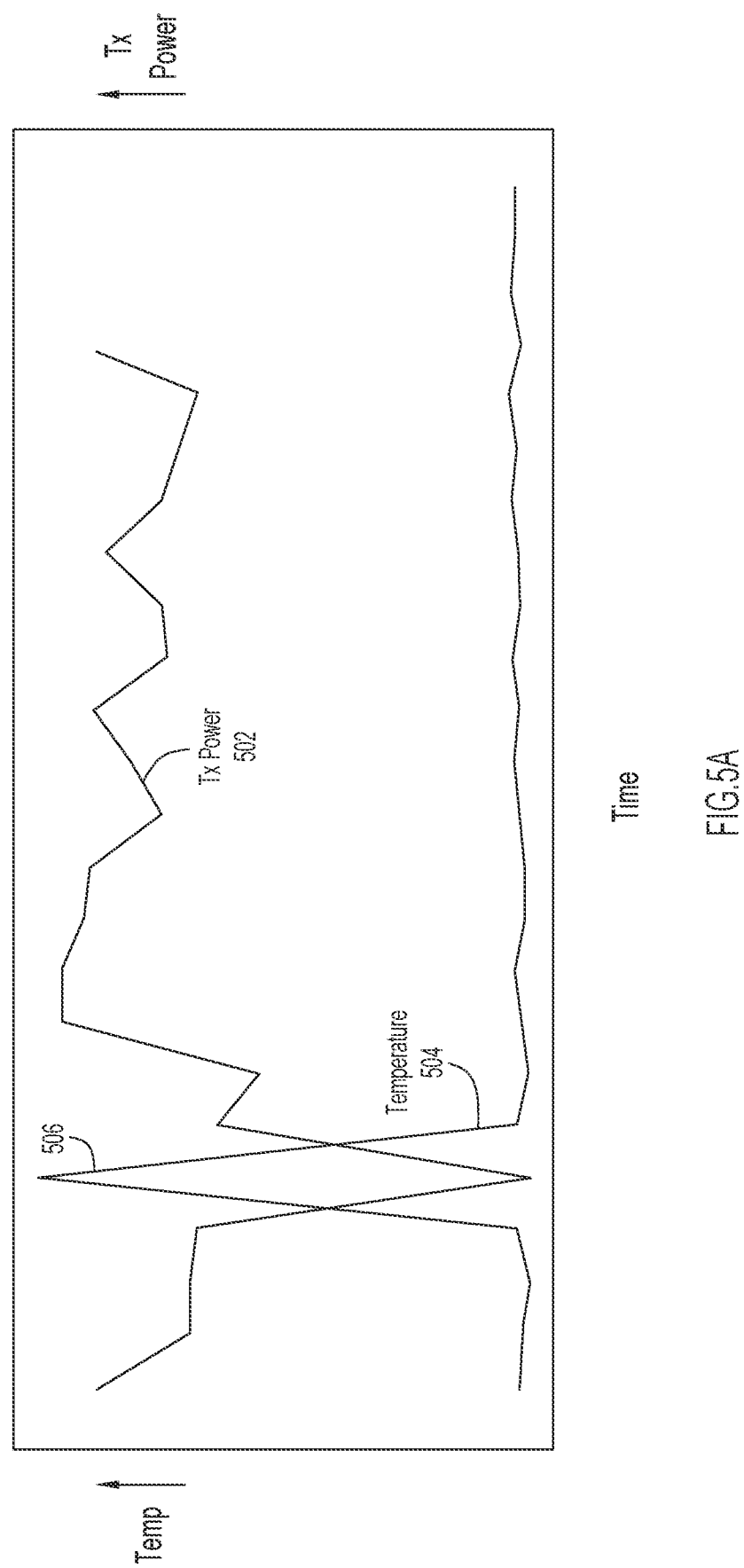
FIG. 5A is an illustration of time series values for optical transmit power and temperature for a transmit-side optical transceiver, according to an example embodiment.

With reference to FIG. 5A, there is an illustration of time series values for Tx power 502 and temperature 504 for a transceiver. As shown in FIG. 5A, a temperature peak 506 coincides with a dip in the Tx power. Just before and just after temperature peak 506, the temperature and the Tx power are negatively correlated, i.e., correspond to Pearson coefficients of −1 or near −1.

Tx/Rx Power and MAC Layer Frame Bit Error ("Frame Error") Analysis

Different types of MAC layer bit and frame errors (referred generally/collectively as MAC layer "frame errors") can occur at a receiver of a receive-side transceiver during optical signal transmission of data frames from a transmit-side transceiver to the receive-side transceiver over a connection (i.e., "on the wire") between the two. The different MAC layer frame errors can be classified broadly into a multi-level (e.g., four-level) hierarchy based on the severity of impact the different MAC layer frame errors have on performance. For example, the different MAC layer frame errors may be ranked in terms of their levels of severity, from lowest to highest, as follows:

a. (Level-1) FEC correctable/corrected errors: FEC has the ability to correct errors in the range of 0.5-1% of the total bits transmitted on the wire. A mildly degraded (receive-side) transceiver may cause this symptom, which causes the FEC correctable error count to increase in the port MAC layer, with little to no impact to a higher layer application to which the transceiver delivers decoded data frames.

b. (Level-2) FEC uncorrectable errors and invalid transmission words (ITWs): FEC uncorrectable errors can increase when the bit errors exceed the FEC correction threshold (e.g., beyond 70 bits per 5280 bits for a 32 Gigabit/s FC link). An ITW received counter (i.e., a count of ITWs) in a port MAC layer can increase when there are coding violations and frame decoder logic fails to decode a received word in a received frame. Since fill words (e.g., "Idle" words) form a majority of what is transmitted on the wire because a communication link often operates at a maximum of 50-60% information words, the ITWs are usually seen significantly in the fill words. Generally, such errors do not cause frame drop per-se and therefore have little impact on the higher layer application, but they can be early indicators of an impending problem and indicative of a moderate level of degradation in the transceiver.

c. (Level-3) CRC errors: CRC errors occur when actual data frames bits (e.g., between a start-of-frame (SOF) and an end-of-frame (EOF)) are corrupted. Such errors result in frame drops, which negatively impact the performance of the higher layer application. Accordingly, CRC errors in the port MAC layer can be an indication of significant degradation of the transceiver.

d. (Level-4) Link reset: When the Rx power drops to an unsustainable level, a link reset can be triggered causing link re-initialization and a link reset count maintained in the port MAC layer to be incremented. This may cause end-devices to reset and/or log out of a switch fabric in the FC SAN example, and thereby cause a major negative impact on the higher layer application.

Analysis of numbers or counts of multiple/different MAC layer frame errors may first identify a time window during which/when respective counts of the different MAC layer frame errors exceed/cross respective predetermined thresholds. Second, the analysis performs a Pearson correlation of time series values for (the number/count of) a type of MAC layer frame error (for whichever one of the different MAC layer frame errors exceeded a respective one of the thresholds) against Rx power time series values (and possibly a Tx power time series values for a peer transceiver) for the time window, to produce a correlation result (e.g., a Pearson coefficient). When the correlation result is positive (e.g., yields a Pearson coefficient >0.5), the analysis concludes that the corresponding type of MAC layer frame error is due to degraded performance of the (receive-side) transceiver. Third, depending on the severity level of the corresponding type of MAC layer frame error in the multi-level hierarchy, the analysis recommends an action to be taken with respect to the (e.g., receive-side) transceiver, with a level of urgency corresponding to the severity level, as follows:

a. Level-1 (FEC correctable): Keep a watch on the transceiver.

b. Level-2 (FEC uncorrectable/ITW): Keep a watch on the transceiver.

c. Level-3 (CRC): Replace the transceiver at the next opportunity.

d. Level-4 (link reset (LR)): Replace the transceiver as soon as possible (ASAP).

Figure 5B:
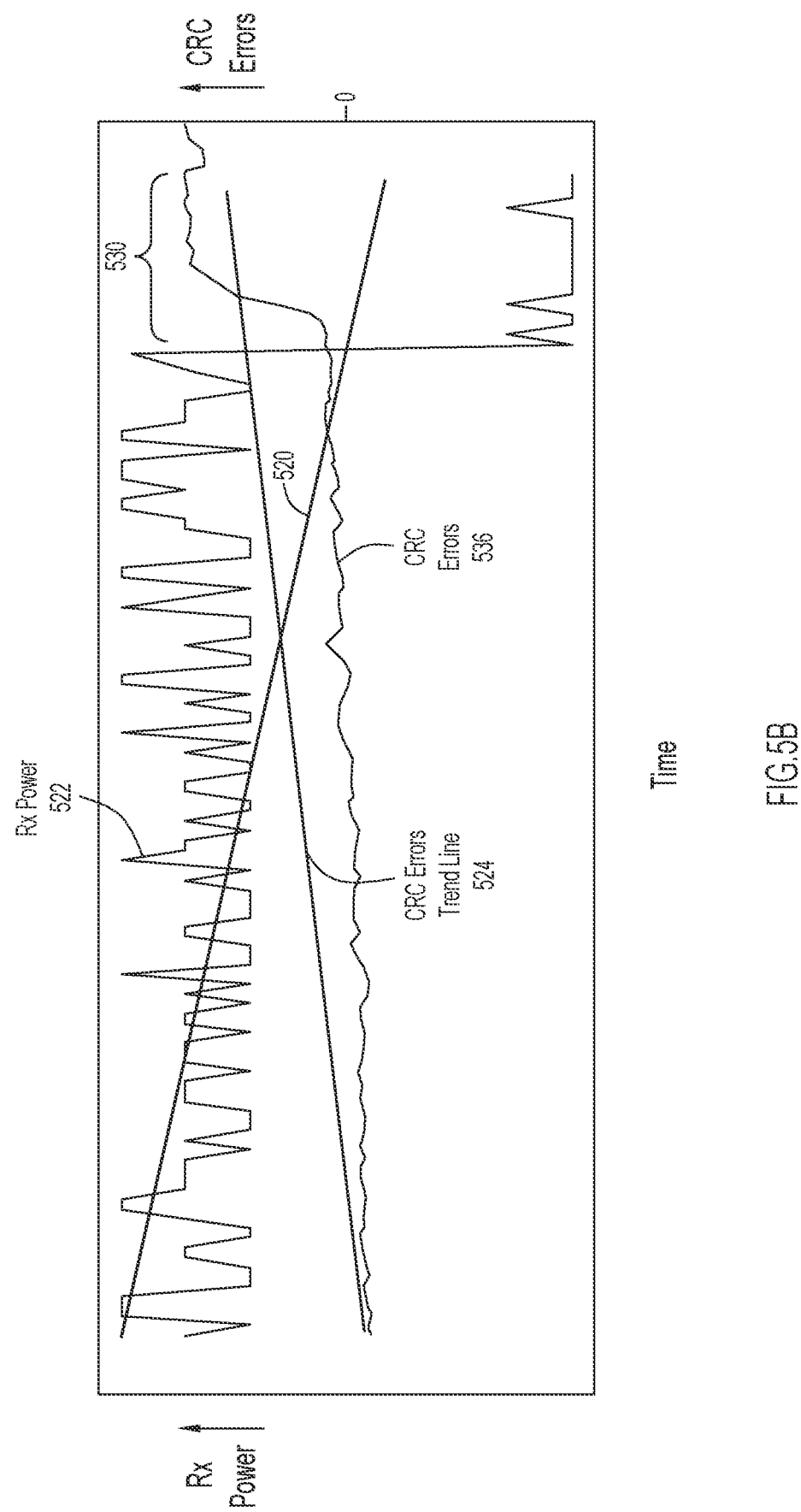
FIG. 5B is an illustration of a receive power trend line derived from a time series of receive power values for an optical transceiver, and a cyclic redundancy check (CRC) errors trend line for the optical transceiver, according to an example embodiment.

With reference to FIG. 5B, there is an illustration of a Rx power trend line 520 derived from a time series of Rx power values 522 for a transceiver, and a CRC errors trend line 524 derived from a time series of CRC errors (count) 536. Rx power trend line 520 is a decreasing trend line (i.e., trends down) due to the sudden dip in Rx power at 530. CRC errors trend line 524 is an increasing trend line because CRC errors 536 increase with the sudden dip in Rx power at 530.

Instantaneous Tx/Rx Power Value Analysis

An analysis of instantaneous Tx/Rx power values for peer transceivers may indicate whether a faulty connection (e.g., cable and/or connectors) between the peer transceivers, rather than the transceivers themselves, is faulty and therefore causing degraded performance. The analysis may employ the following checks on the Tx/Rx power values:

a. If the Tx/Rx power falls below a threshold (e.g., −12 dBm) during operation of a transceiver, this indicates excessive power loss, which is most likely due to a faulty connection (e.g., a bad splice, dust on a connector or improper seating). Components of the connection may require repair or an optical cleaning.

b. If the Tx/Rx power drops to a minimum level (e.g., −30 dBm or lower), this indicates a very weak optical signal or no optical signal is being received. In this case, the connection (e.g., cable) may have been cut and may require replacement.

c. If the Tx power is null (i.e., Tx power values are unavailable), and current in the receive-side transceiver is 0 mA, this indicates the receive-side transceiver may be shut down.

d. If the Rx power is null, this indicates that the peer transceiver is shut down.

e. If the Rx power is null, the Tx power is null, and the receive-side transceiver current is 0 mA, both transceivers may have been shut down.

Flowcharts

Figure 6:
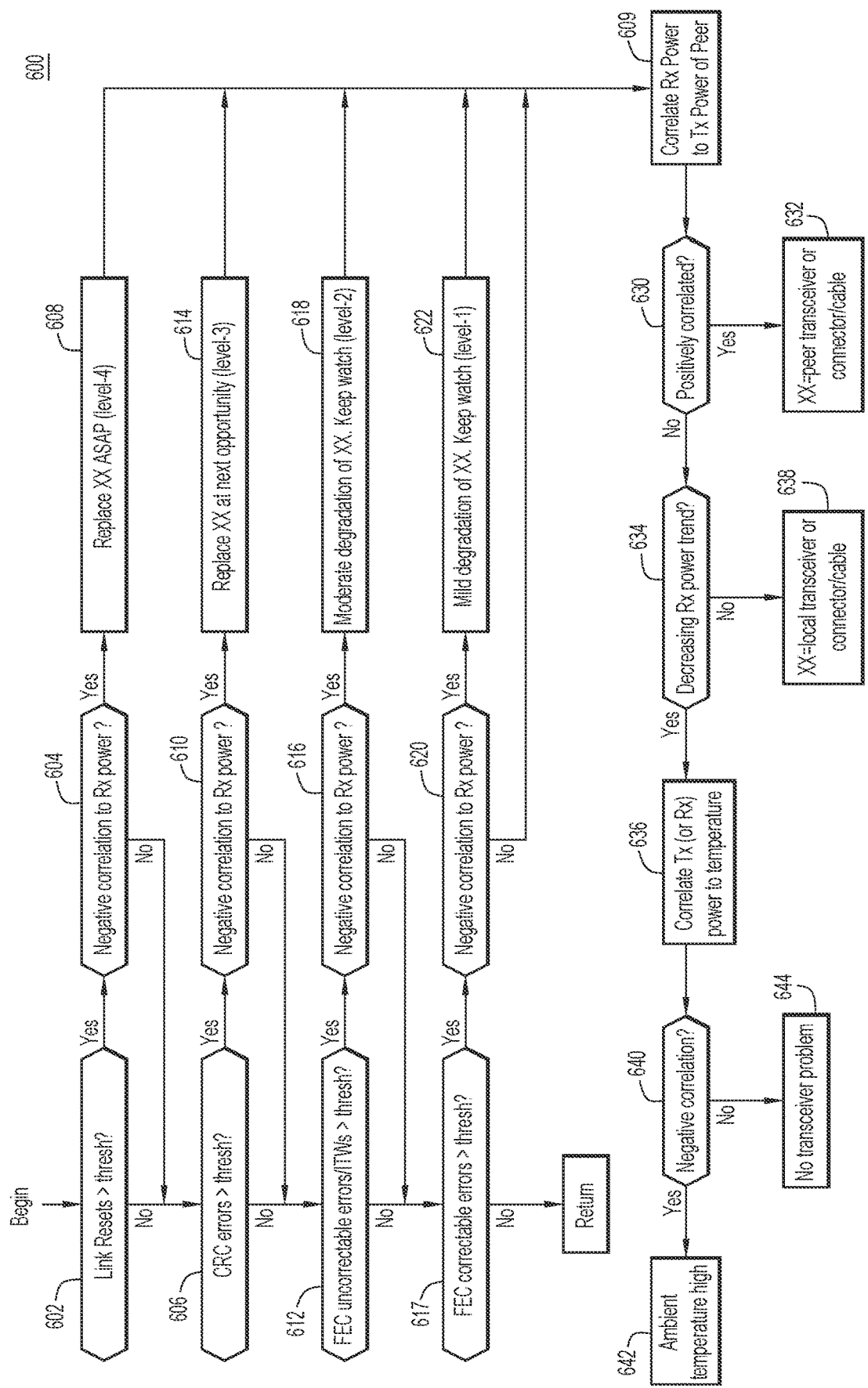
FIG. 6 shows operations for an analysis used for early identification of problems (e.g., degraded operation) associated with an optical transceiver, a peer optical transceiver, and/or a connection between the two, according to an example embodiment.

With reference to FIG. 6, there are shown operations for an example analysis 600 for early identification of problems (e.g., degraded operation) associated with a transceiver (also referred to as a "local" transceiver), a peer transceiver, and/or a connection between the two. In other words, analysis 600 identifies problems in a transceiver system that includes the transceiver, the peer transceiver, and the connection between the two. Analysis 600 uses various sets of time series values corresponding to/for various operating parameters. In the ensuing description, "time series values for an operating parameter" are also referred to equivalently as "operating parameter time series values."

Analysis 600 uses time series values for Rx power and time series values for numbers/counts of different MAC layer frame errors for the transceiver on the data switch port/interface of interest. The different MAC layer frame errors ranked in order of severity from highest to lowest include (level-4) link resets, (level-3) CRC errors, (level-2) FEC uncorrectable errors/ITWs, and (level-1) FEC correctable errors. Analysis 600 also uses time series values for Tx power and for temperature for the peer transceiver.

For clarity, in the ensuing description, reference to a "correlation of a first operating parameter against/to a second operating parameter" is understood to mean a "correlation of first operating parameter time series values against second operating parameter time series values." In other words, a correlation between two operating parameters is performed using the time series values of the two operating parameters.

At 602, the analysis determines whether a number (i.e., count) of link resets exceeds a threshold for link resets (i.e., a level-4 error). If yes, flow proceeds to 604 and, if no, flow proceeds to 606. At 604, the analysis performs a level-4 correlation (e.g., a Pearson correlation) of time series values for a number of link resets to/against the Rx power time series values (i.e., a correlation of a number of link resets to Rx power) for the transceiver, to produce a level-4 correlation result (e.g., a Pearson coefficient). When the level-4 correlation result is a negative correlation, meaning that the trend of link resets is negatively correlated to the trend of Rx power over time, flow proceeds to 608, where the analysis generates an incomplete level-4 urgency (most urgent) action message "(level-4) Replace component XX ASAP." The analysis holds this action message until subsequent operations (beginning at 609) specifically identify the component XX. Flow proceeds from 608 to 609.

When the level-4 correlation result is not negative, flow proceeds from 604 to 606. At 606, the analysis tests whether a number of CRC errors exceeds a threshold for CRC errors (i.e., level-3 errors). If yes, flow proceeds to 610 and, if no, flow proceeds to 612. At 610, the analysis performs a level-3 correlation of the number of CRC errors (i.e., the time series values for the number of CRC errors) to the Rx power (i.e. the time series values for the Rx power) to produce a level-3 correlation result. When the level-3 correlation result indicates a negative correlation, flow proceeds to 614, where the analysis generates an incomplete level-3 urgency ($2^{nd}$ most urgent) action message "(level-3) Replace component XX at next opportunity." The analysis holds this action message until subsequent operations (beginning at 609) specifically identify the component XX. Flow proceeds from 614 to 609.

At 612, the analysis tests whether a number of uncorrectable FEC errors/ITWs (i.e., level-2 errors) exceeds a threshold. If yes, flow proceeds to 616 and, if no, flow proceeds to 617. At 616, the analysis performs a level-2 correlation of the number of FEC uncorrectable errors/ITWs (i.e., the time series values for the number of FEC uncorrectable errors/ITWs) to the Rx power to produce a level-2 correlation result. When the level-2 correlation result indicates a negative correlation, flow proceeds to 618, where the analysis generates an incomplete level-2 urgency (least urgent) action message "(level-2) Moderate degradation of component XX. Keep a watch." The analysis holds this action message until subsequent analysis operations (beginning at 609) specifically identify the component XX. Flow proceeds from 618 to 609.

At 617, the analysis tests whether a number of FEC correctable errors exceeds a threshold for FEC correctable errors (i.e., level-1 errors). If yes, flow proceeds to 620 and, if no, flow returns. At 620, the analysis performs a level-1 correlation of the number of FEC correctable errors (i.e., the time series values for the number of FEC correctable) against the Rx power to produce a level-1 correlation result. When the level-1 correlation result indicates a negative correlation, flow proceeds to 622, where the analysis generates an incomplete level-1 urgency action message "(level-1) Mild degradation of component XX. Keep watch." The analysis holds this action message until subsequent analysis operations (beginning at 609) specifically identify the component XX. Flow proceeds from 622 to 609.

The next operations beginning at 609 identify "XX," i.e., which specific component(s) may be experiencing degradation. At 609 and 630, the analysis performs a Tx-Rx power correlation of the Tx power time series values for the peer transceiver against the Rx power time series values of the transceiver to produce a Tx-Rx power correlation result, and then tests whether the Tx-Rx power correlation result indicates that the peer transceiver Tx power and the transceiver Rx power are positively correlated. If yes, flow proceeds to 632 and, if no, flow proceeds to 634. At 632, the analysis identifies XX as the peer transceiver or the connection to the peer transceiver, and replaces "component XX" with "peer transceiver or the connection to the peer transceiver" in the incomplete level-4, level-3, level-2, or level-1 urgency action message being held at 608, 614, 618, or 622, respectively, to complete the action message. The analysis sends the action message (now completed) to the administrative portal, and the method returns.

At 634, the analysis determines whether the Rx power time series values show a decreasing trend over time. If yes, flow proceeds to 636 and, if no, flow proceeds to 638. At 638, the analysis identifies the component XX as the (local) transceiver (i.e., the transceiver to which the Rx power time series values apply) or the connection to the transceiver, and replaces "component XX" with "local transceiver or the connection to the local transceiver" in the previously held action message, to complete the action message (similar to operation 632). The analysis sends the action message (now completed) to the administrative portal, and the method returns.

At 636 and 640, the analysis tests whether a correlation of Tx power time series values for the (local) transceiver to the temperature time series values for the (local) transceiver returns a negative correlation result. If yes, flow proceeds to 642 and, if no, flow proceeds to 644. At 642, the analysis sends to the administrative portal an alert message indicating that the local transceiver is experiencing a high ambient temperature, and that instructs the administrator to reduce the ambient temperature of the rack housing the data switch where the transceiver is present. At 644, the analysis concludes that there is no transceiver degradation and does not send any of the held messages.

Figure 7:
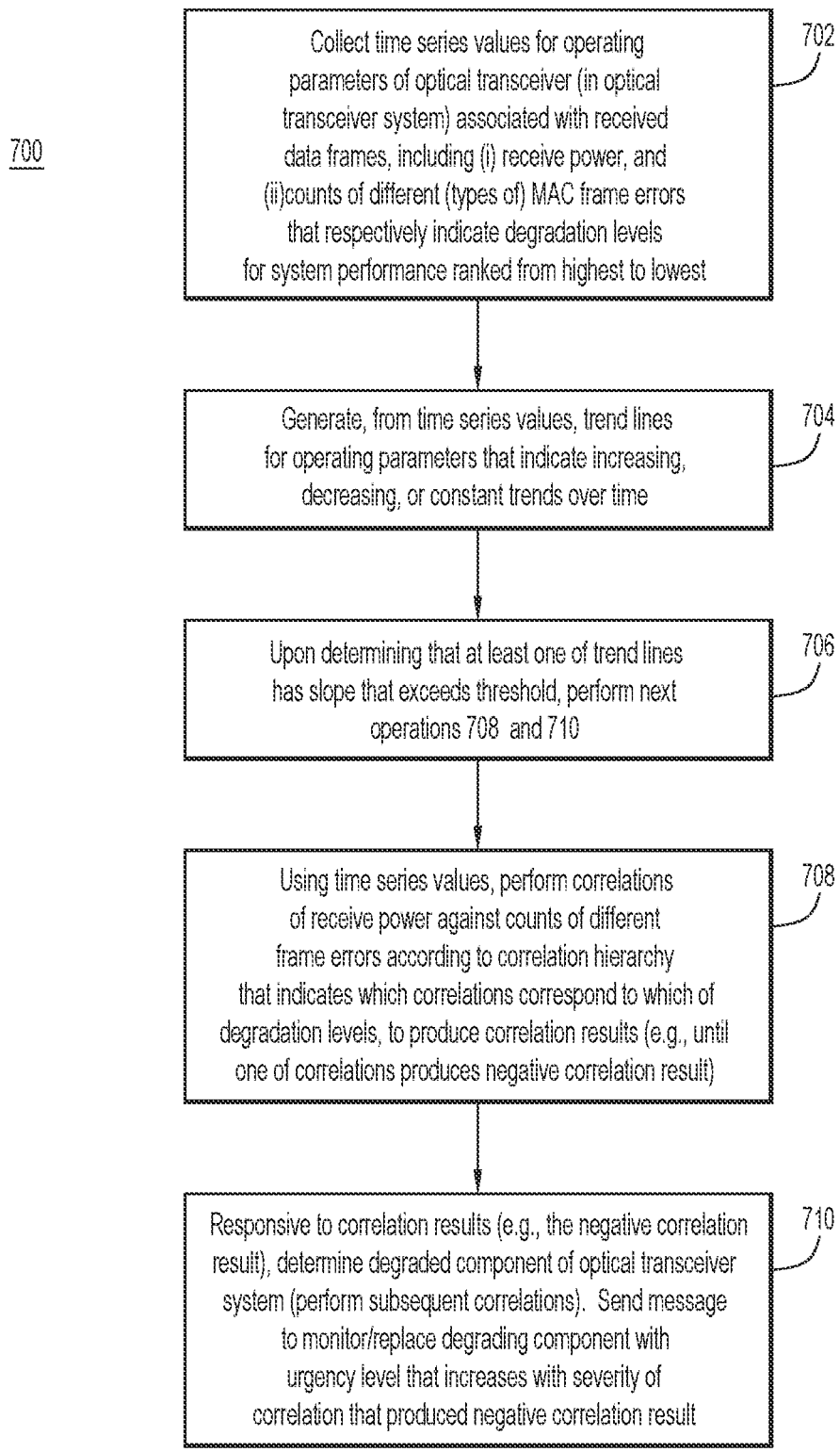
FIG. 7 is a flowchart of a method of monitoring an optical transceiver system for early identification of degrading components, according to an example embodiment.

With reference to FIG. 7, there is a flowchart of an example method 700 of monitoring an optical transceiver system for early identification of degrading components in the optical transceiver system. The optical transceiver system includes a (local) optical transceiver (e.g., 110(2)) to receive an optical signal that conveys data frames transmitted by a peer optical transceiver (e.g., 110(1)) over an optical connection, which includes an optical cable and connectors to the optical transceivers. Method 700 may be performed by a management entity (e.g., 104). Method 700 includes operations described above.

At 702, the management entity collects time series values for various operating parameters of the optical transceiver (e.g., 110(2)) associated with received data frames, including (i) receive power (i.e., receive power time series values), transmit power (i.e., transmit power time series values), and temperature (i.e., temperature time series values), and (ii) counts of different (e.g., MAC layer) frame errors (e.g., respective sets of time series values for a count of link resets, a count of CRC errors, a count of FEC uncorrectable errors/ITWs, and a count of FEC correctable errors), that respectively indicate degradation levels for system performance ranked from highest to lowest. The different MAC layer frame errors include, in order of degradation level from highest to lowest, link resets, CRC errors, and at least one type of FEC errors (e.g., FEC uncorrectable errors/ITWs, and FEC correctable errors).

At 704, the management entity generates trend lines for the various operating parameters based on their respective time series values. The trend lines may include a receive power trend line, a transmit power trend line, a temperature trend line, and trend lines for the counts of the different MAC layer frame errors. Trend lines show increasing, decreasing, or relatively constant trends over time for their corresponding operating parameters.

At 706, the management entity determines whether any of the trend lines has a slope that exceeds a threshold slope. When one or more of the trend lines exceeds the threshold slope, the management entity performs next operations 708 and 710. When none of the trend lines exceeds the threshold slope, the management entity does not perform next operations 708 and 710.

At 708, the management entity performs individual correlations (e.g., Pearson correlations) of the receive power (time series values) against the counts of the different MAC layer frame errors (i.e., the time series values for each of the counts of the different MAC layer frame errors) according to a correlation hierarchy that indicates which of the correlations correspond to which of the degradation levels (i.e., each individual correlation is associated/identified with its corresponding degradation level), to produce correlation results, e.g., until one of the correlations produces a negative correlation result (e.g., a negative Pearson coefficient). The negative correlation result indicates, for example, that the receive power is decreasing over time while the count of one of the different MAC layer frame errors that produced the negative correlation result is increasing over time. An example of the correlation hierarchy is shown in FIG. 6 at 602-620, which establishes a series or sequence of level-4 to level-1 individual correlations performed in an order, e.g., decreasing order, set by decisional logic. At least one of the individual correlations is performed only when at least one of the counts of the different MAC layer frame errors corresponding to the at least one of the individual correlations has a magnitude that exceeds a threshold count (for the frame errors).

Responsive to the correlation results (e.g., the negative correlation result), at 710, the management entity determines a degraded component of the optical transceiver system based on subsequent correlations of the receive power time series values against time series values of one or more additional operating parameters for the optical transceiver and the peer optical transceiver. In addition, the management entity may send an action message indicating to replace the degraded component with an urgency that increases as a degradation level among the degradation levels corresponding to the negative correlation result increases. For example, level-1 to level-4 degradation levels result in sending a least urgent to a most urgent message to monitor/replace the degraded component. The message may include the degradation level.

The management entity may determine the degraded component (that is reported in the action message) according to the following:

a. Correlate the transmit power (time series values) of the peer optical transceiver (e.g., 110(1)) against the receive power (time series values) of the optical transceiver (e.g., 110(2)), to produce a power correlation result (operation 609 in FIG. 6).

b. When the power correlation result is positive, declare that the degraded component is the peer optical transceiver (e.g., 110(1)) or the optical connection (operation 632).

c. When the power correlation result is negative, determine whether the receive power decreases over time or does not decrease over time (operation 634).

d. When the receive power does not decrease over time, declare that the degraded component is the (local) optical transceiver (e.g., 110(2)) or the optical connection (operation 638).

e. When the receive power decreases over time, correlate a transmit power (time series values) of the optical transceiver (e.g., 110(1)) against the temperature (time series of values) of the optical transceiver (e.g., 110(1)) to produce a temperature correlation result (operation 636).

i. When the temperature correlation result is negative, declare there is no degraded component, and reporting this conclusion to the administrative portal (operation 644).

ii. When the temperature correlation result is positive, declare there is a high ambient temperature condition at the optical transceiver, and reporting the condition to the administrative portal (operation 642).

Hardware Device

Figure 8:
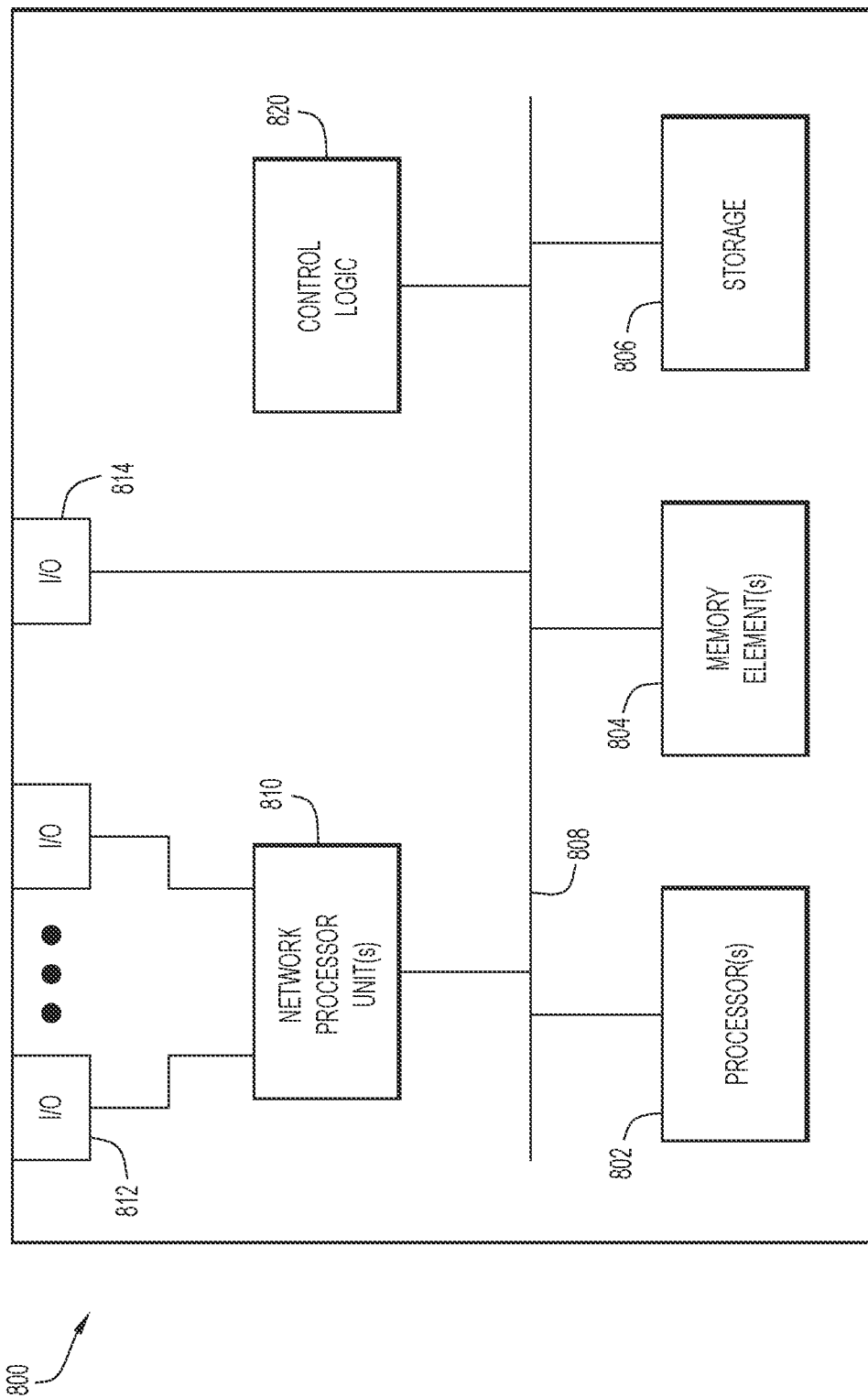
FIG. 8 is a hardware block diagram of a device that may perform functions associated with embodiments presented herein, according to an example embodiment.

FIG. 8 is a hardware block diagram of a device 800 that may perform functions associated with any of the operations discussed above, such as but not limited to any of the discussions of FIGS. 1-7. Device 800 may represent data switch 102(i) and/or management entity 104 and its administrative portal. Device 800 may incorporate one or more optical transceivers, as described above, in which case portions of device 800 incorporate the optical transceivers and a port MAC layer, for example.

In at least one embodiment, the computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. This may be the case, in particular, when the device 800 serves as a user device described herein, for example, when the user device serves as the administrative portal to receive and display action messages described above. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including: at a management entity configured to monitor a transceiver system having a transceiver to receive a signal that conveys data frames transmitted by a peer transceiver over a connection: collecting time series values for operating parameters of the transceiver associated with received data frames, including (i) a receive power, and (ii) counts of different media access control (MAC) layer frame errors that respectively indicate degradation levels for system performance ranked from highest to lowest; using the time series values, performing correlations of the receive power against the counts of the different MAC layer frame errors according to a correlation hierarchy that indicates which of the correlations correspond to which of the degradation levels, to produce correlation results; and responsive to the correlation results, determining a degraded component of the transceiver system.

In some aspects, the techniques described herein relate to a method, further including: responsive to the correlation results, sending an indication to replace the degraded component with an urgency that increases with increases in a degradation level among the degradation levels corresponding to the correlation results.

In some aspects, the techniques described herein relate to a method, further including: generating, from the time series values, trend lines for the operating parameters that indicate increasing, decreasing, or constant trends over time for the operating parameters; and upon determining that at least one of the trend lines has a slope that exceeds a threshold, performing the correlations and determining the degraded component.

In some aspects, the techniques described herein relate to a method, wherein: generating includes generating the trend lines to include a receive power trend line for the receive power and frame-error trend lines for the counts of the different MAC layer frame errors.

In some aspects, the techniques described herein relate to a method, wherein a negative correlation result among the correlation results indicates that the receive power is decreasing while one of the counts of the different MAC layer frame errors that produces the negative correlation result is increasing.

In some aspects, the techniques described herein relate to a method, further including: performing at least one of the correlations only when at least one of the counts of the different MAC layer frame errors has a magnitude that exceeds a threshold.

In some aspects, the techniques described herein relate to a method, wherein: the different MAC layer frame errors include, in order of degradation level from highest to lowest, link resets, cyclic redundancy check (CRC) errors, and at least one type of forward error correction (FEC) errors.

In some aspects, the techniques described herein relate to a method, wherein the transceiver system is an optical transceiver system in which the transceiver, the signal, the peer transceiver, and the connection are an optical transceiver, an optical signal, an optical peer transceiver, and an optical connection, respectively.

In some aspects, the techniques described herein relate to a method, wherein determining further includes: correlating a transmit power of the peer transceiver against the receive power of the transceiver, to produce a power correlation result; and when the power correlation result is positive, declaring that the degraded component is the peer transceiver or the connection.

In some aspects, the techniques described herein relate to a method, wherein determining further includes: when the power correlation result is negative, determining whether the receive power decreases over time; and when the receive power does not decrease over time, declaring that the degraded component is the transceiver or the connection.

In some aspects, the techniques described herein relate to a method, wherein determining further includes: when the receive power decreases over time, correlating time series values for a transmit power of the transceiver against time series values for a temperature of the transceiver to produce a temperature correlation result; and when the temperature correlation result is negative, declaring there is no degraded component.

In some aspects, the techniques described herein relate to a method, wherein determining further includes: when the temperature correlation result is positive, declaring there is a high ambient temperature at the transceiver.

In some aspects, the techniques described herein relate to an apparatus including: a network input/output interface to communicate with one or more networks; and a processor of a management entity configured to monitor a transceiver system having a transceiver to receive a signal that conveys data frames transmitted by a peer transceiver over a connection, the processor coupled to the network input/output interface and configured to perform: collecting time series values for operating parameters of the transceiver associated with received data frames, including (i) a receive power, and (ii) counts of different media access control (MAC) layer frame errors that respectively indicate degradation levels for system performance ranked from highest to lowest; using the time series values, performing correlations of the receive power against the counts of the different MAC layer frame errors according to a correlation hierarchy that indicates which of the correlations correspond to which of the degradation levels, to produce correlation results; and responsive to the correlation results, determining a degraded component of the transceiver system.

In some aspects, the techniques described herein relate to an apparatus, wherein the processor is further configured to perform: responsive to the correlation results, sending an indication to replace the degraded component with an urgency that increases with increases in a degradation level among the degradation levels corresponding to the correlation results.

In some aspects, the techniques described herein relate to an apparatus, wherein the processor is further configured to perform: generating, from the time series values, trend lines for the operating parameters that indicate increasing, decreasing, or constant trends over time for the operating parameters; and upon determining that at least one of the trend lines has a slope that exceeds a threshold, performing the correlations and determining the degraded component.

In some aspects, the techniques described herein relate to an apparatus, wherein: the different MAC layer frame errors include, in order of degradation level from highest to lowest, link resets, cyclic redundancy check (CRC) errors, and at least one type of forward error correction (FEC) errors.

In some aspects, the techniques described herein relate to a non-transitory computer readable medium encoded with instructions that, when executed by a processor of a management entity configured to monitor a transceiver system having a transceiver to receive a signal that conveys data frames transmitted by a peer transceiver over a connection, cause the processor to perform: collecting time series values for operating parameters of the transceiver associated with received data frames, including (i) a receive power, and (ii) counts of different media access control (MAC) layer frame errors that respectively indicate degradation levels for system performance ranked from highest to lowest; using the time series values, performing correlations of the receive power against the counts of the different MAC layer frame errors according to a correlation hierarchy that indicates which of the correlations correspond to which of the degradation levels, to produce correlation results; and responsive to the correlation results, determining a degraded component of the transceiver system.

In some aspects, the techniques described herein relate to a non-transitory computer readable medium, further including instructions to cause the processor to perform: responsive to the correlation results, sending an indication to replace the degraded component with an urgency that increases with increases in a degradation level among the degradation levels corresponding to the correlation results.

In some aspects, the techniques described herein relate to a non-transitory computer readable medium, further including instructions to cause the processor to perform: generating, from the time series values, trend lines for the operating parameters that indicate increasing, decreasing, or constant trends over time for the operating parameters; and upon determining that at least one of the trend lines has a slope that exceeds a threshold, performing the correlations and determining the degraded component.

In some aspects, the techniques described herein relate to a non-transitory computer readable medium, wherein: the different MAC layer frame errors include, in order of degradation level from highest to lowest, link resets, cyclic redundancy check (CRC) errors, and at least one type of forward error correction (FEC) errors.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at a management entity configured to monitor a transceiver system having a transceiver to receive a signal that conveys data frames transmitted by a peer transceiver over a connection:
collecting time series values for operating parameters of the transceiver associated with received data frames, including (i) a receive power, and (ii) counts of different media access control (MAC) layer frame errors that respectively indicate degradation levels for system performance ranked from highest to lowest, wherein the different MAC layer frame errors include, in order of degradation level from highest to lowest, link resets and other types of MAC layer frame errors
using the time series values, performing correlations of the receive power against the counts of the different MAC layer frame errors according to a correlation hierarchy that indicates which of the correlations correspond to which of the degradation levels, to produce correlation results; and
responsive to the correlation results, determining a degraded component of the transceiver system.

2. The method of claim 1, further comprising:
sending an action message with an indication to replace the degraded component with an urgency that increases with increases in the degradation levels.

3. The method of claim 1, further comprising:
generating, from the time series values, trend lines for the operating parameters that indicate increasing, decreasing, or constant trends over time for the operating parameters; and
upon determining that at least one of the trend lines has a slope that exceeds a threshold, performing the correlations and determining the degraded component.

4. The method of claim 3, wherein:
generating includes generating the trend lines to include a receive power trend line for the receive power, and frame-error trend lines for the counts of the different MAC layer frame errors.

5. The method of claim 1, wherein a negative correlation result among the correlation results indicates that the receive power is decreasing while one of the counts of the different MAC layer frame errors that produces the negative correlation result is increasing.

6. The method of claim 1, further comprising:
performing at least one of the correlations only when at least one of the counts of the different MAC layer frame errors has a magnitude that exceeds a threshold.

7. The method of claim 1, wherein:
the different MAC layer frame errors include, in order of degradation level from highest to lowest, the link resets, cyclic redundancy check (CRC) errors, and at least one type of forward error correction (FEC) errors.

8. The method of claim 1, wherein the transceiver system is an optical transceiver system in which the transceiver, the signal, the peer transceiver, and the connection are an optical transceiver, an optical signal, an optical peer transceiver, and an optical connection, respectively.

9. The method of claim 1, wherein determining further includes:
correlating a transmit power of the peer transceiver against the receive power of the transceiver, to produce a power correlation result; and
when the power correlation result is positive, declaring that the peer transceiver or the connection is the degraded component.

10. The method of claim 9, wherein determining further includes:
when the power correlation result is negative, determining whether the receive power decreases over time; and
when the receive power does not decrease over time, declaring that the transceiver or the connection is the degraded component.

11. The method of claim 10, wherein determining further includes:
when the receive power decreases over time, correlating time series values for a transmit power of the transceiver against time series values for a temperature of the transceiver to produce a temperature correlation result; and
when the temperature correlation result is negative, declaring there is no degraded component.

12. The method of claim 11, wherein determining further includes:
when the temperature correlation result is positive, declaring there is a high ambient temperature at the transceiver.

13. An apparatus comprising:
a network input/output interface to communicate with one or more networks; and
a processor of a management entity configured to monitor a transceiver system having a transceiver to receive a signal that conveys data frames transmitted by a peer transceiver over a connection, the processor coupled to the network input/output interface and configured to perform:
collecting time series values for operating parameters of the transceiver associated with received data frames, including (i) a receive power, and (ii) counts of different media access control (MAC) layer frame errors that respectively indicate degradation levels for system performance ranked from highest to lowest, wherein the different MAC layer frame errors include, in order of degradation level from highest to lowest, link resets and other types of MAC layer frame errors
using the time series values, performing correlations of the receive power against the counts of the different MAC layer frame errors according to a correlation hierarchy that indicates which of the correlations correspond to which of the degradation levels, to produce correlation results; and
responsive to the correlation results, determining a degraded component of the transceiver system.

14. The apparatus of claim 13, wherein the processor is further configured to perform:
sending an action message with an indication to replace the degraded component with an urgency that increases with increases in the degradation levels.

15. The apparatus of claim 13, wherein the processor is further configured to perform:
generating, from the time series values, trend lines for the operating parameters that indicate increasing, decreasing, or constant trends over time for the operating parameters; and
upon determining that at least one of the trend lines has a slope that exceeds a threshold, performing the correlations and determining the degraded component.

16. The apparatus of claim 13, wherein:
the different MAC layer frame errors include, in order of degradation level from highest to lowest, the link resets, cyclic redundancy check (CRC) errors, and at least one type of forward error correction (FEC) errors.

17. A non-transitory computer readable medium encoded with instructions that, when executed by a processor of a management entity configured to monitor a transceiver system having a transceiver to receive a signal that conveys data frames transmitted by a peer transceiver over a connection, cause the processor to perform:
collecting time series values for operating parameters of the transceiver associated with received data frames, including (i) a receive power, and (ii) counts of different media access control (MAC) layer frame errors that respectively indicate degradation levels for system performance ranked from highest to lowest, wherein the different MAC layer frame errors include, in order of degradation level from highest to lowest, link resets and other types of MAC layer frame errors
using the time series values, performing correlations of the receive power against the counts of the different MAC layer frame errors according to a correlation hierarchy that indicates which of the correlations correspond to which of the degradation levels, to produce correlation results; and
responsive to the correlation results, determining a degraded component of the transceiver system.

18. The non-transitory computer readable medium of claim 17, further comprising instructions to cause the processor to perform:
sending an action message with an indication to replace the degraded component with an urgency that increases with increases in the degradation levels.

19. The non-transitory computer readable medium of claim 17, further comprising instructions to cause the processor to perform:
generating, from the time series values, trend lines for the operating parameters that indicate increasing, decreasing, or constant trends over time for the operating parameters; and
upon determining that at least one of the trend lines has a slope that exceeds a threshold, performing the correlations and determining the degraded component.

20. The non-transitory computer readable medium of claim 17, wherein:
the different MAC layer frame errors include, in order of degradation level from highest to lowest, the link resets, cyclic redundancy check (CRC) errors, and at least one type of forward error correction (FEC) errors.

* * * * *

UNITED STATES PATENT AND TRADEMARK OFFICE
CERTIFICATE OF CORRECTION

| | | |
|---|---|---|
| PATENT NO. | : 12,355,563 B2 | Page 1 of 1 |
| APPLICATION NO. | : 17/582838 | |
| DATED | : July 8, 2025 | |
| INVENTOR(S) | : Harsha Bharadwaj et al. | |

It is certified that error appears in the above-identified patent and that said Letters Patent is hereby corrected as shown below:

In the Claims

Claim 1, Column 20, Line 37, please replace "frame errors" with --frame errors;--

Claim 13, Column 21, Line 63, please replace "frame errors" with --frame errors;--

Claim 17, Column 22, Line 39, please replace "frame errors" with --frame errors;--

Signed and Sealed this
Twenty-first Day of October, 2025

John A. Squires
*Director of the United States Patent and Trademark Office*